(12) United States Patent
Bohrer

(10) Patent No.: US 6,688,418 B2
(45) Date of Patent: Feb. 10, 2004

(54) DRIVE SYSTEM FOR A UTILITY VEHICLE

(75) Inventor: Stefan Bohrer, Wendel (DE)

(73) Assignee: Deere & Company, Moline, IL (US)

( * ) Notice: Subject to any disclaimer, the term of this patent is extended or adjusted under 35 U.S.C. 154(b) by 3 days.

(21) Appl. No.: 10/080,325

(22) Filed: Feb. 21, 2002

(65) Prior Publication Data

US 2002/0121399 A1 Sep. 5, 2002

(30) Foreign Application Priority Data

Mar. 1, 2001 (DE) .......................... 101 09 775

(51) Int. Cl.[7] .............................................. B60K 17/00
(52) U.S. Cl. ...................... 180/305; 180/53.1; 180/383
(58) Field of Search ................. 280/305, 306, 280/307, 308, 53.1, 53.2, 244, 245, 377, 383; 475/72, 83

(56) References Cited

U.S. PATENT DOCUMENTS

| | | | | |
|---|---|---|---|---|
| 3,637,036 A | * | 1/1972 | Swisher et al. ............. 180/307 |
| 3,913,697 A | * | 10/1975 | Greene ....................... 180/14.3 |
| 4,043,227 A | * | 8/1977 | Beals et al. .................... 477/69 |
| 4,177,870 A | | 12/1979 | Henn |
| 4,186,816 A | | 2/1980 | Pfundstein |
| 4,401,182 A | * | 8/1983 | Pollman ..................... 180/242 |
| 4,431,073 A | * | 2/1984 | Nagao et al. ............. 180/6.48 |
| 4,487,002 A | | 12/1984 | Kruse et al. |
| 4,518,053 A | * | 5/1985 | Queveau ..................... 180/14.2 |
| 4,582,141 A | * | 4/1986 | van der Lely ................. 172/3 |
| 4,621,495 A | * | 11/1986 | Hedlund ........................ 60/447 |
| 4,778,020 A | * | 10/1988 | Hagin et al. ............... 180/53.4 |
| 4,793,434 A | * | 12/1988 | Bachle ........................ 180/243 |
| 4,884,475 A | * | 12/1989 | Walzer et al. ................. 60/434 |
| 4,905,544 A | * | 3/1990 | Ganoung ..................... 477/109 |
| 4,939,954 A | * | 7/1990 | Walzer et al. ............... 74/733.1 |
| 4,941,372 A | * | 7/1990 | Aoki et al. .................. 477/129 |
| 5,012,887 A | * | 5/1991 | Butz et al. .................... 180/305 |
| 5,188,007 A | * | 2/1993 | Hattori et al. ................. 474/28 |
| 5,351,570 A | * | 10/1994 | Mizunuma et al. ........... 74/335 |
| 5,388,450 A | * | 2/1995 | Hurth ........................... 74/331 |
| 5,807,199 A | * | 9/1998 | Keller ........................... 475/72 |
| 6,059,534 A | * | 5/2000 | Kotake et al. ................. 417/15 |
| 6,164,923 A | * | 12/2000 | Mayer et al. ................. 417/212 |
| 6,223,848 B1 | * | 5/2001 | Young et al. ................ 180/242 |
| 6,227,326 B1 | * | 5/2001 | Kowalyk et al. ........... 180/344 |
| 6,230,830 B1 | * | 5/2001 | Chorney et al. ........... 180/53.6 |
| 6,272,950 B1 | * | 8/2001 | Braun et al. ............... 74/731.1 |
| 6,321,867 B1 | * | 11/2001 | Kowalyk ..................... 180/307 |

FOREIGN PATENT DOCUMENTS

EP          0 774 383          5/1997

* cited by examiner

*Primary Examiner*—Brian L. Johnson
*Assistant Examiner*—Bridget Avery

(57) ABSTRACT

A drive system for a utility vehicle (10) containing a motor (12) that is connected to and drives a hydraulic pump (14) which, in turn, is connected to a hydraulic motor (16). The hydraulic motor drives a ground engaging element through a gearbox having different selectable gears. A speed-adjustment device (26, 122) cooperates with the hydraulic pump (14) and/or the hydraulic motor (16) to adjust the rotational speed of the hydraulic motor (16). In order to make available the full rotational speed range of the hydraulic motor (16) in the lower gears while ensuring the observation of the maximum permissible speed in the highest gear, the invention provides a control device to limit the rotational speed of the hydraulic motor (16) to a predetermined value if the highest gear(s) of the gearbox (18) is selected.

8 Claims, 5 Drawing Sheets

DRIVE SYSTEM FOR A UTILITY VEHICLE

BACKGROUND OF THE INVENTION

The invention pertains to a drive system for a utility vehicle having a drive motor that is connected to and drives a hydraulic pump, which, in turn, is connected to a hydraulic motor so that hydraulic fluid is conveyed between the pump and the hydraulic motor. The hydraulic motor is connected to and drives a ground engaging member through a gearbox, which has different selectable gears. A speed-adjustment device cooperates with the hydraulic pump and/or the hydraulic motor is provided for adjusting the rotational speed of the hydraulic motor, and wherein the speed-adjustment device can be adjusted over a range that includes an upper limit in order to define a maximum speed.

Means to limit the maximum speed which the hydraulic pump of a utility vehicle, particularly an agricultural harvesting vehicle, can be driven, are known from the prior art. For this reason, the maximum pivot angle of the adjustment lever of the hydraulic pump is mechanically limited by means of a limit stop. This limit on the utility vehicle is factory set in accordance with the legal stipulations of a given country. For example, the maximum speed for harvesting machines in Germany is 20 km/h, with 25 km/h for other European countries. The setting of the maximum speed takes place in the highest gear usually designed for road travel.

It is disadvantageous that the mechanical limitation on the maximum speed of the hydraulic pump not only limits the road speed of the vehicle, but also the speed for field work in all other gears. The speed of a harvesting machine driven on roads is limited to 20 km/h in Germany. However, in principle, the maximum speed in all gears that are used during field work is unnecessarily limited due to the mechanical limitation on the hydraulic pump adjustment lever pivot angle.

SUMMARY OF THE INVENTION

The invention is based on the objective of improving a drive system of the above-described type in such a way that the propulsion is not unnecessarily limited in the lower gears of the gearbox.

The invention proposes to select the range of motion of the speed-adjustment device that cooperates with the hydraulic pump and/or the hydraulic motor as a function of the selected gear of the gearbox. This makes the full range of motion available, especially for the lower gears of the gearbox. Thus, the full rotational speed range of the hydraulic motor and the entire vehicle speed range are also available. However, if the highest gear (or one of the higher gears) is selected in which the maximum permissible speed can be exceeded in a corresponding position of the speed-adjustment device, the range of motion of the speed-adjustment device is defined, or limited, in such a way that the maximum permissible speed cannot be exceeded. In this case, the rotational speed of the hydraulic motor is limited to a fixed value that is below the maximum set value for another gear.

In this way, the full rotational speed range of the hydraulic motor is available in the lower gears, while it is ensured that the maximum permissible speed is observed in the highest gear. This speed cannot be exceeded in the lower gears due to the gear ratios. The speed-adjustment device may be actuated by a drive that is controlled by an electronic controller and moves the speed-adjustment device over a defined adjustment range. In principle, this can be realized in one of two ways:

It is possible to provide a control device that operates without feedback. The respectively selected gear ratio of the gearbox is detected by a sensor. If the gear ratio is so high that the maximum permissible speed can be exceeded in a corresponding position of the speed-adjustment device, the range of motion of the speed-adjustment device is automatically limited to a permissible range. This may be realized mechanically, electronically or electro-mechanically. Otherwise, the full range of motion of the speed-adjustment device is available. The sensor may be linked to the drive lever, the actuation of which is only permitted in the field, which implies that the highest gear ratio is not selected. Alternatively, it would also be possible to utilize a road/field switch or a switch that responds when the highest gear ratio is selected.

It would also be possible to provide a control device that measures the propulsion or a parameter related to it, for example, the rotational speed of the wheels or the rotational speed of the output shaft of the gearbox. Alternatively, the rotational speed of the hydraulic motor and the position of the adjustment lever for selecting the gear ratios of the gearbox may also be measured at the same time. The propulsion can be calculated on the basis of these parameters. The control device takes into consideration a nominal speed value that is predetermined by a drive lever or an accelerator pedal and correspondingly adjusts the speed-adjustment device. If the measured speed is faster than the given permissible maximum propulsion, the control device automatically adjusts the speed-adjustment device to a slower speed in order to limit the speed to the maximum permissible value. Thus feedback is used. It is not absolutely imperative in this case to separately sense the given selected gear ratio because it can be determined from the measured propulsion.

Another possibility consists of providing a limit stop that upwardly limits the range of motion of the speed-adjustment device mechanically when a gear is selected in which the maximum permissible speed can be exceeded. The speed-adjustment device can be actuated mechanically or electro-mechanically. The limit stop is ineffective when another gear is selected.

BRIEF DESCRIPTION OF THE DRAWINGS

Three embodiments of the invention are described in greater detail below with reference to the figures. The figures show.

DESCRIPTION OF THE PREFERRED EMBODIMENT

Figure 1:
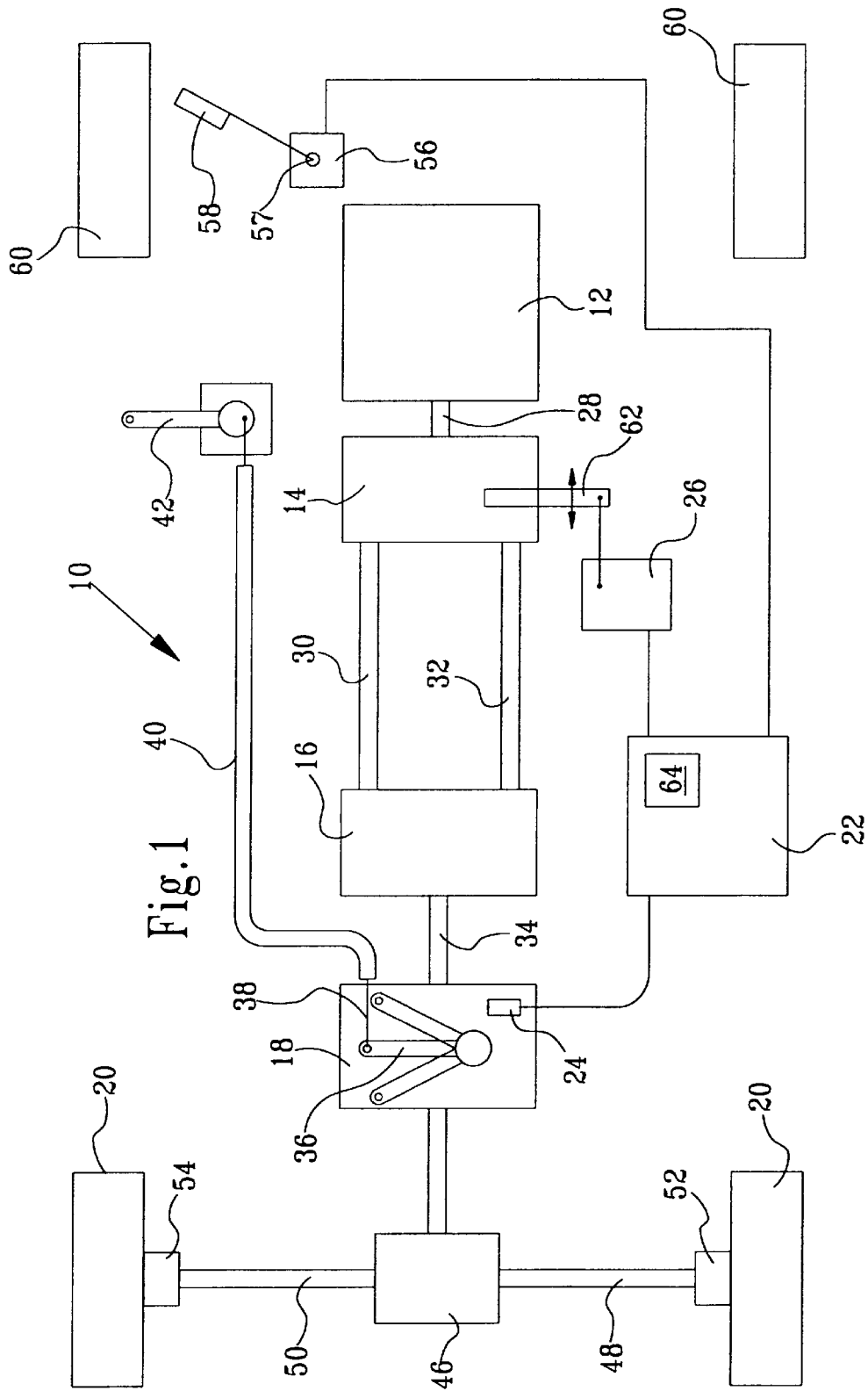
FIG. 1 is a schematic top view of a utility vehicle with a drive system according to the invention that contains an electronically controlled speed-adjustment device.

The utility vehicle 10 shown in FIG. 1 contains a drive motor 12, for example, a an internal combustion engine or an electric motor that is supplied with electrical energy from a fuel cell, battery, etc. The drive motor 12 may mechanically drive other devices of the utility vehicle 10, for example, material processing devices of an agricultural harvesting vehicle. A chassis, not shown in the figure, carries the individual elements of the utility vehicle 10.

The motor 12 mechanically drives a hydraulic pump 14 via a first shaft 28. The hydraulic pump 14 is connected to a hydraulic motor 16 via a first hydraulic fluid line 30 and a second hydraulic fluid line 32. Hydraulic fluid circulated by the hydraulic pump 14 in the hydraulic fluid lines 30, 32 drives the hydraulic motor 16, which, in turn, drives a second shaft 34 to rotate. The hydraulic pump 14 and the hydraulic motor 16 are generally known and consequently require no further description.

The second shaft 34 mechanically drives a gearbox 18 in which different gears can be selected by means of an adjustment lever 36. The given gear is selected by means of a gear shift lever 42 that pivots the adjustment lever 36 via a Bowden cable 38 housed in a cable sleeve 40. The gear shift lever 42 is located at the vehicle's operator's station, which is not shown in the figure so as to provide a better overview. The adjustment lever 36 is pivoted via the Bowden cable 38 when the gear shift lever 42 is actuated in order to select the given gear. The gearbox 18 shown has three gears as indicated by the three positions of the adjustment lever 36. The invention can be used with any gearbox having two or more gears. The gearbox 18 drives a third shaft 44, which, in turn, drives a fourth shaft 48 and a fifth shaft 50 through a differential gear 46. The fourth shaft 48 is connected to a ground engaging member in the form of a wheel 20 by means of an axle attachment 52. The fifth shaft is connected to an oppositely arranged ground engaging member in the form of a wheel 20 by means of a corresponding axle attachment 54. It would also be possible to utilize an endless track instead of wheels 20. The utility vehicle 10 is supported on the ground by means of two additional non-driven wheels 60. However, it could also be conceivable to drive wheels 60. At least one of the wheel pairs 20, 60 can be steered.

An electronic controller 22 is connected to a drive lever sensor 56 that cooperates with a drive lever 58, also located on the operator's station and arranged to be pivoted about an axis 57. The drive lever 58 serves to adjust the driving speed of the vehicle. The drive lever sensor 56 senses the respective angle of the drive lever 58 and delivers an electric signal containing information on the given position of the drive lever 58 to the controller 22. The controller 22 may also be connected to an accelerator pedal (not illustrated in the figure) that can also serve to adjust the vehicle speed.

The controller 22 is also connected to an adjustment lever sensor 24. Sensor 24 is arranged on or coupled to the gearbox 18 and senses whether or not the adjustment lever 36 is located in a position that corresponds to the highest gear of the gearbox 18. The adjustment lever sensor 24 delivers an electric signal to the controller 22, that indicates whether or not the highest gear of the gearbox 18 was selected by means of the gear shift lever 42.

The controller 22 is also electrically connected to a speed-adjustment device 26, i.e. an actuator equipped with a servomotor. The actuator mechanically moves a swash plate adjustment lever 62. The swash plate adjustment lever 62 moves the swash plate of the hydraulic pump 14 which controls the quantity of hydraulic fluid circulated by the hydraulic pump 14 per unit time. Alternatively, the motor 16 may be a variable speed motor and the swash plate adjustment lever 62 may be on the motor 16.

It should be noted that the gearbox 18 contains a reverse gear. Alternatively, the swash plate adjustment lever 62 can be adjusted between a forward drive position and a reverse drive position.

Figure 2:
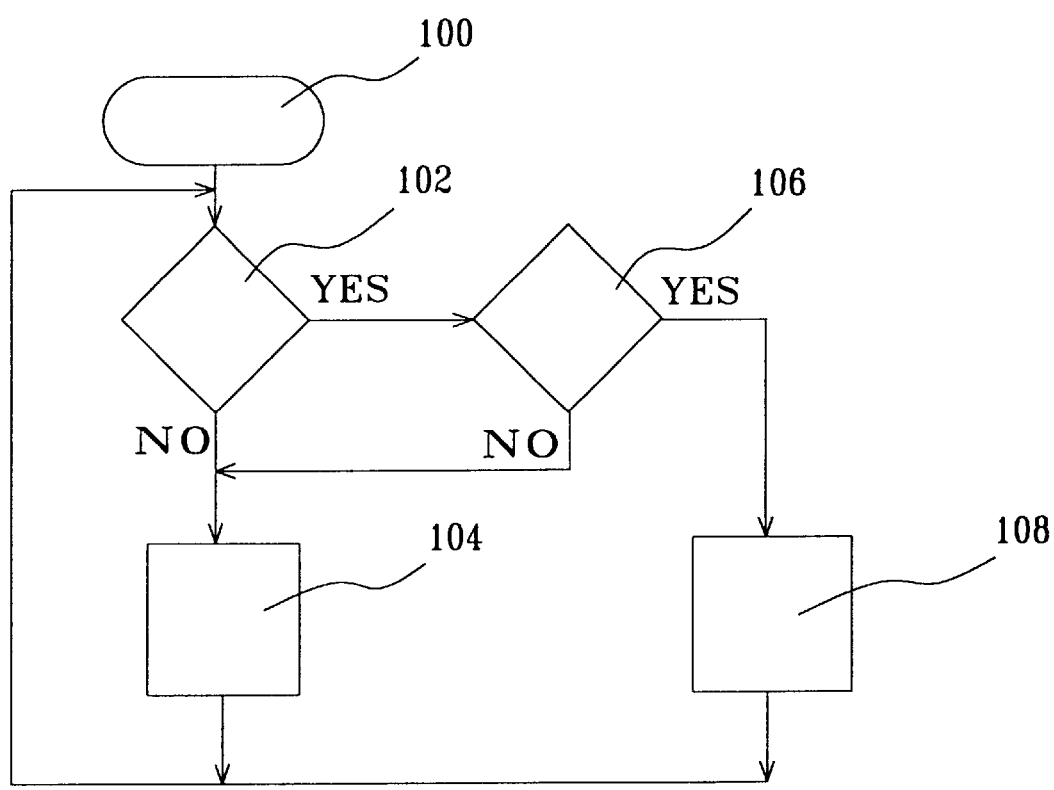
FIG. 2 is a flow chart which describes the operation of the microprocessor of the electronic control of FIG. 1.

The controller 22 includes a microprocessor 64, the function of which is shown in FIG. 2. After start step 100, for example, after the motor 12 of the utility vehicle 10 is started, the next processing step is step 102, in which the signal of the adjusting level sensor 24 is examined to determine whether the adjustment lever 36 is located in a position which corresponds to the highest gear ratio of the gearbox 18, i.e., third gear. If this is not the case, the next processing step is step 104, in which the microprocessor 64 controls the speed-adjustment device 26 in accordance with the position of the drive lever 58. Thus, the speed-adjustment device 26 moves the swash plate of the hydraulic pump 14 into the position that corresponds to the propulsion of the wheels 20 desired by the driver. In this case, the hydraulic motor 16 turns with a rotational speed that corresponds to the desired propulsion. After step 104, control returns to step 102. If it is determined in step 102 that third gear was selected, process control goes to step 106, where it is determining whether the drive lever 58 is located in a position that corresponds to a propulsion which is above the maximum permissible speed of the utility vehicle 10.

The given selected gear of the gearbox 18, which is sensed by the adjustment lever sensor 24, is also taken into consideration in step 106. The maximum permissible speed may vary from country to country and either be input during the manufacture of the utility vehicle 10 or by service personnel or defined by means of an EPROM, a binary switch, a potentiometer etc. If the selected speed is higher than the maximum speed, the next processing step is step 108, in which the speed-adjustment device 26 is moved into a position that corresponds to the maximum permissible speed. In this case, the hydraulic motor 16 turns with a rotational speed that corresponds to the maximum permissible propulsion. After step 108, process control returns to step 102. If the inquiry in step 106 indicates that the selected speed is not above the maximum permissible speed, process control goes to step 104. The inquiry in step 106 no longer must take place if third gear is not selected because the utility vehicle cannot reach the maximum permissible speed in the other positions of the adjustment lever 36 due to the gear ratios of the gearbox 18. It would also be possible to omit step 102 and always process step 106 after step 100 (and 104 and 108) because the given selected gear of the gearbox 18 is also taken into consideration in step 106.

Thus, the attainable speed in the lower gears is not dependent on the maximum permissible propulsion that is specifically defined for the given country. The swash plate of the hydraulic pump 14 can be pivoted by the maximum pivot angle in the lower gears. The maximum pivot angle is only limited in accordance with the specifications of the given country in the highest gear.

Figure 3:
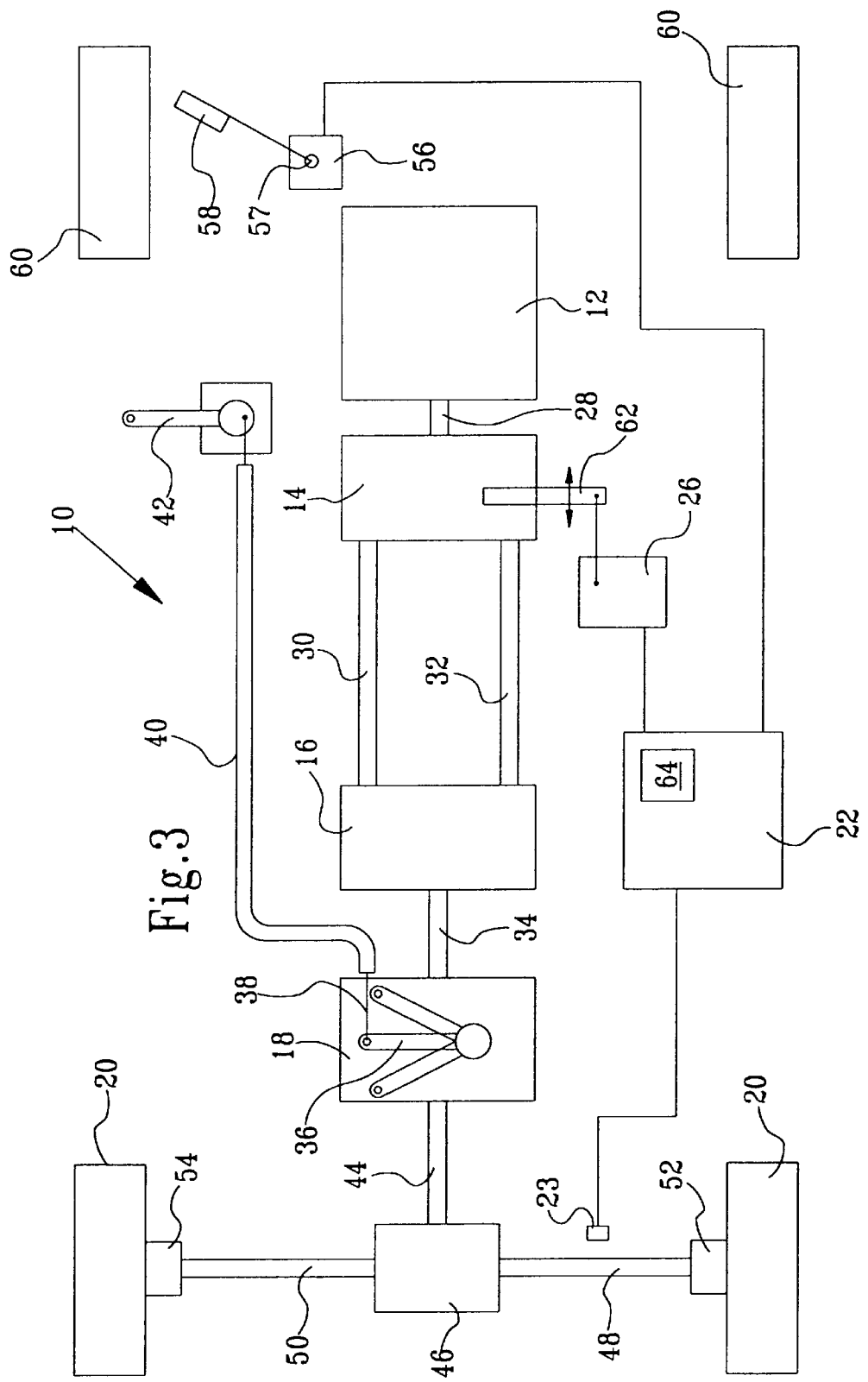
FIG. 3 is a schematic top view of a utility vehicle with a drive system according to the invention which contains another electronically controlled speed-adjustment device.

FIG. 3 shows a second embodiment of a drive system for the utility vehicle 10 according to the invention, wherein elements that correspond to the first embodiment are identified by the same reference numerals.

The controller 22 of the utility vehicle 10 according to FIG. 3 is not connected to an adjusting level sensor 24 arranged on the gearbox 18. In this embodiment, a speed sensor 23 is provided that senses the rotational speed of the fourth shaft 48. The speed sensor 23 cooperates optically, electronically, etc. with corresponding markings, magnets, teeth, etc., on the fourth shaft 48. Its output signal contains information concerning the propulsion speed of the vehicle.

Figure 4:
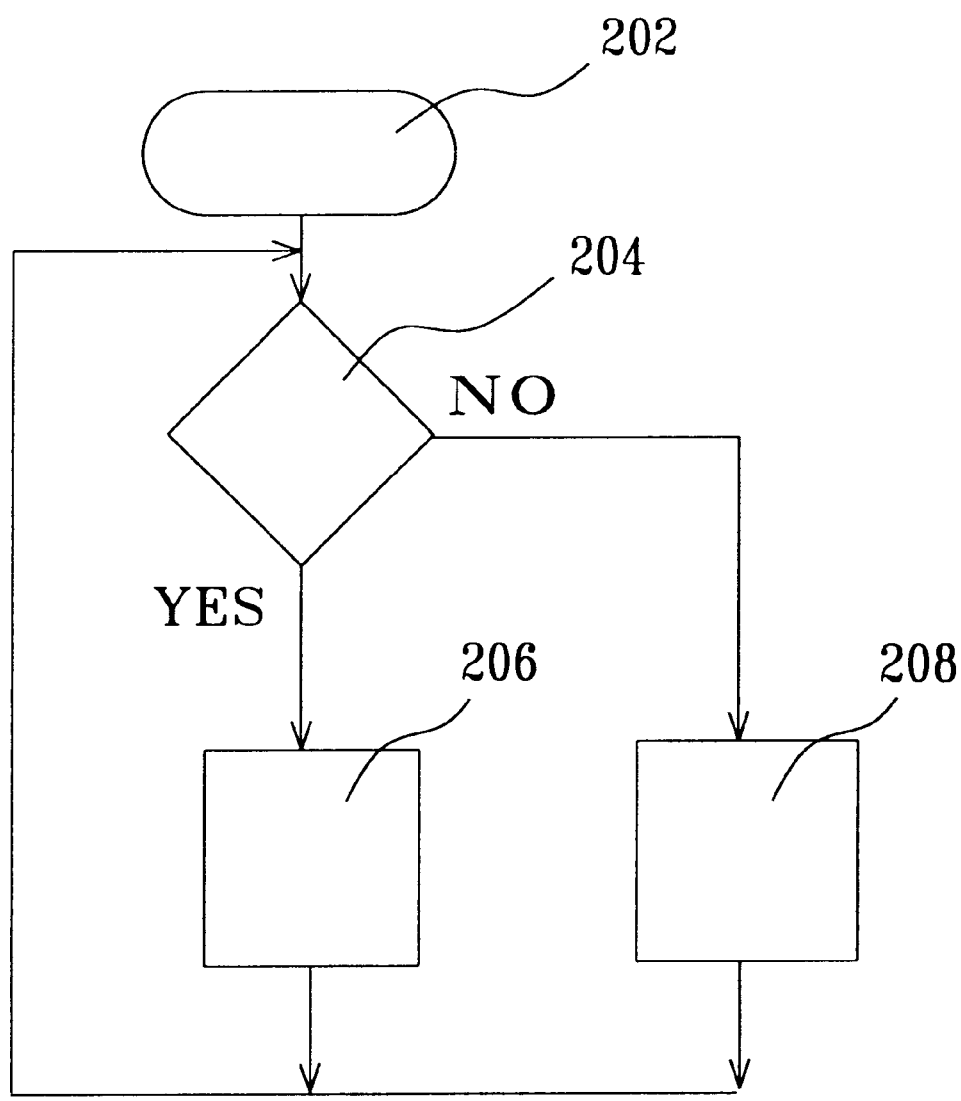
FIG. 4 is a flow chart which describes the operation of the microprocessor of the electronic control of FIG. 3.

The microprocessor 64 of the controller 22 operates as shown in FIG. 4. After the start step 202, the next processing step is step 204, in which it is determined whether the actual speed is above the maximum permissible speed. The maximum permissible speed may be defined (programmed) as described above with reference to the first embodiment of the invention. If the result of step 204 indicates that said speed is exceeded, process control goes to step 206 in which the speed-adjustment device 26 reduces the speed. After step 206, process control returns to step 204. Otherwise, the next step is step 208, in which the propulsion of the utility vehicle 10 is adjusted to the set value. In this case, the set value predetermined by the drive lever 58 and the actual value measured by the speed sensor 23 are compared. The controller 22 moves the speed-adjustment device 26 into the corresponding position. After step 208, process control returns to step 204.

Figure 5:
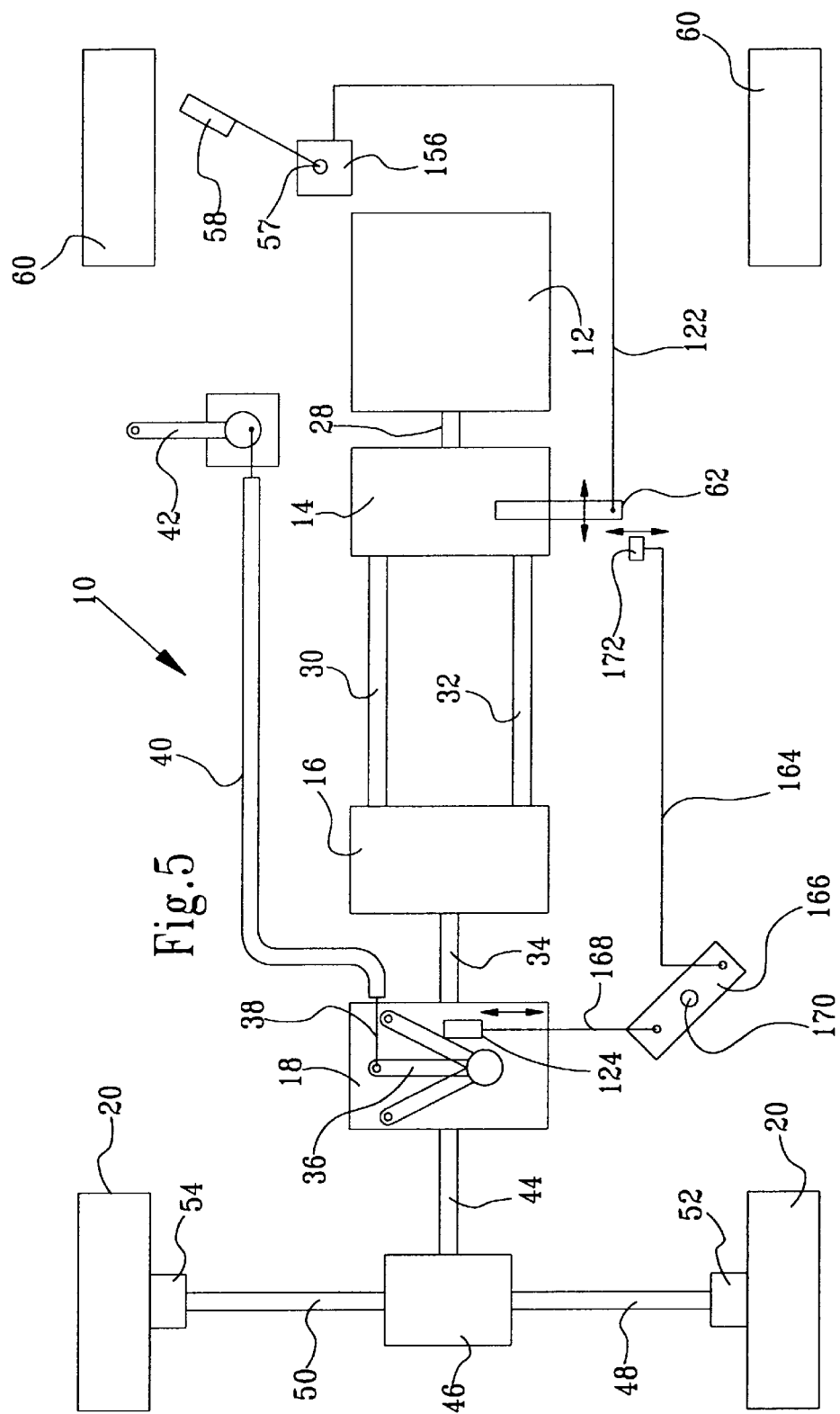
FIG. 5 is a schematic top view of a utility vehicle with a drive system according to the invention which contains a mechanical speed-adjustment device.

FIG. 5 shows a third embodiment of a drive system for the utility vehicle 10 according to the invention. Elements that correspond to the first embodiment are designated by the same reference numbers. In the third embodiment, the propulsion is adjusted purely mechanically.

The drive lever 58 is connected to a mechanical drive 156 which adjusts a speed-adjustment device 122, which is realized in the form of a rod assembly (or cable pull). The speed-adjustment device 122 is designed to move the swash plate adjustment lever 62 of the hydraulic pump 14. The rotary speed of the hydraulic motor 16 increases with the distance that the swash plate adjustment lever 62 is pivoted to the left.

A mechanical sensor 124 in the form of a probe is arranged on the gearbox 22. The probe moves downward, relative to FIG. 3, via the adjustment lever 36 when the adjustment lever 26 is located in the position indicated by the broken lines on the right, which corresponds to the highest selectable gear, i.e., third gear. The sensor 124 is connected to a first rod assembly 168 that actuates a lever 166 that can be pivoted about an axis 170. A second rod assembly 164 is linked to the lever 166 opposite to the point at which the first rod assembly 168 is mounted on the lever 166, where the second rod assembly is connected to a limit stop 172. The limit stop 172 is arranged in such a way that it limits the pivot angle of the swash plate adjustment lever 62 to the left, and thus limits the rotational speed of the hydraulic motor 16, when the sensor 124 moves downward (and the highest gear is selected) by the adjustment lever 36. If another gear is selected, the limit stop 172 is moved out of the pivot range of the swash plate adjustment lever 62 such that the swash plate adjustment lever 62 can be moved over its entire adjustment range by the drive lever 58. The position of the limit stop 172 may be made adjustable in order to define the maximum possible speed (in accordance with the given country).

In the remaining gears of the gearbox 22, the rotary speed of the hydraulic motor 16 need not be limited by the limit stop 172 because the gear ratios are chosen such that the maximum permissible propulsion will not be reached.

Naturally, it would also be possible to use a simple mechanism for moving the limit stop 172 without requiring the use of the lever 166. Instead of cooperating with the swash plate adjustment lever 62, the limit stop 172 could also cooperate with a separate element connected to the speed-adjustment device 122.

In the three embodiments described above, the full rotational speed range of the hydraulic motor 16 is available in the lower gears, wherein it is ensured that the maximum permissible speed is observed in the highest gear.

What is claimed is:

1. A drive system for a utility vehicle comprising:

a drive motor;

a hydraulic pump driven by the drive motor;

a hydraulic motor driven by the pump;

a gearbox driven by the hydraulic motor and having a plurality of different selectable gears;

a ground engaging member driven by the hydraulic motor through the gearbox;

a speed adjustment device cooperatively coupled with the hydraulic pump and/or hydraulic motor to adjust the speed of the hydraulic motor over a range that includes an upper limit that defines a maximum speed; and a control device for operating the speed adjustment device to vary the upper limit of the speed of the hydraulic motor as a function of the gear of the gearbox.

2. The drive system as defined by claim 1 wherein the control device provides for a lower upper limit in a gear of the gearbox that represents the highest gear or gears than for lower gears.

3. The drive system as defined by claim 1 wherein the control device includes an electronic controller and the speed adjustment device includes a drive that is controlled by the electronic controller.

4. The drive system as defined by claim 1 wherein the adjustment range of the speed-adjustment device is limited by a limit stop.

5. The drive system as defined by claim 1 wherein the speed-adjustment device is connected to a swash plate adjustment lever that is operable to adjust a swash plate of the hydraulic pump or motor.

6. The drive system as defined by claim 3 further comprising a gear selector sensor that senses the given selected gear of the gearbox and generates a signal to the electronic controller for use in moving the speed-adjustment device as a function of the signal from the gear selector sensor.

7. The drive system as defined by claim 3 further comprising a speed sensor that generates a signal to the electronic controller containing information concerning the speed of the utility vehicle and wherein the electronic controller moves the speed-adjustment device over an adjustment range as a function of the signal from the speed sensor.

8. The drive system as defined by claim 4 wherein the limit stop can be moved as a function of the selected gear of the gearbox.

* * * * *